(12) United States Patent
Manken et al.

(10) Patent No.: US 7,726,431 B2
(45) Date of Patent: Jun. 1, 2010

(54) STEERING DRIVE FOR A WHEEL OF A GROUND CONVEYOR WITH AN APPARATUS FOR RECORDING THE ACTUAL ANGLE OF THE STEERED WHEEL

(75) Inventors: Frank Manken, Henstedt-Ulzburg (DE); Bjorn Nommensen, Hamburg (DE); Christoph Weber, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 35 days.

(21) Appl. No.: 11/780,096

(22) Filed: Jul. 19, 2007

(65) Prior Publication Data

US 2008/0018072 A1  Jan. 24, 2008

(30) Foreign Application Priority Data

Jul. 22, 2006  (DE) ........................ 10 2006 033 958

(51) Int. Cl.
B62D 5/04  (2006.01)

(52) U.S. Cl. .................................................. 180/253

(58) Field of Classification Search ......... 180/443–444, 180/253; 475/4; 477/12
See application file for complete search history.

(56) References Cited

U.S. PATENT DOCUMENTS

| | | | | |
|---|---|---|---|---|
| 613,894 A | * | 11/1898 | Vaughan ..................... | 310/115 |
| 3,140,075 A | * | 7/1964 | Kolthoff, Jr. ................ | 254/2 B |
| 4,688,655 A | * | 8/1987 | Shimizu ..................... | 180/446 |
| 4,956,590 A | * | 9/1990 | Phillips ...................... | 318/432 |
| 5,050,697 A | * | 9/1991 | Umemura ................... | 180/422 |
| 5,145,022 A | * | 9/1992 | Kido ........................... | 180/412 |
| 6,012,347 A | * | 1/2000 | Hasegawa ............... | 74/388 PS |
| 6,135,233 A | * | 10/2000 | Yamauchi ................... | 180/443 |
| 6,481,272 B1 | * | 11/2002 | Kieselbach ............... | 73/117.02 |
| 6,904,999 B2 | * | 6/2005 | Kojo et al. .................. | 180/422 |
| 7,118,506 B2 | * | 10/2006 | Zheng et al. .................. | 475/18 |

FOREIGN PATENT DOCUMENTS

DE  196 25 350 C2  5/2001
DE  10 2004 006 722 A  9/2009

\* cited by examiner

*Primary Examiner*—Lesley Morris
*Assistant Examiner*—Levon Fiore
(74) *Attorney, Agent, or Firm*—Vidas, Arrett & Steinkraus, P.A.

(57) ABSTRACT

Steering drive for a wheel of a ground conveyor with an apparatus for recording the actual angle of the steered wheel, with a steering motor, a steering controller or regulator driven by a steering angle transmitter, the input signal of which is given to the steering motor, a steering drive coupled with the shaft of the steering motor, the output side of which is connected with a steering plate, which mounts the steered wheel, and a rotation angle sensor, which records the rotation angle of the steering plate, wherein the shaft of the steering motor is designed as a hollow shaft, through which a sensor drive shaft is inserted and which is connected on the drive side with the output side of the steering drive and works together with the angle sensor on the side of the steering motor facing away from the steering drive.

9 Claims, 2 Drawing Sheets

STEERING DRIVE FOR A WHEEL OF A GROUND CONVEYOR WITH AN APPARATUS FOR RECORDING THE ACTUAL ANGLE OF THE STEERED WHEEL

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Electrical steering drives have a steering motor, the input signal of which depends on the recorded position of the steering transmitter (drawbar or steering wheel). A steering drive, which gears down the steering motor tuning at a higher speed, is required in order to transfer the rotary motion of the steering motor to a steering plate, through which the driven wheel is swivel mounted around a vertical axis. In order to record the steering angle, a rotation angle sensor is provided, the output signal of which goes to the steering control.

Different options are known to record the actual angle of the steered wheel with the help of a sensor. A sensor drive, which is coupled with the shaft of the steering motor, is provided in a known embodiment. When the steering motor moves the steering plate with a plurality of revolutions (e.g. 100 revolutions) in a working range of e.g. ±90° via the steering drive, the sensor moves in its measurement range of e.g. ±180°. The sensor is hereby arranged on the side of the steering motor that is opposite the steering drive, which accommodates the available cramped installation space. However, the disadvantage is that a complicated sensor drive must be provided.

Furthermore, it is known to drive the sensor drive with the shaft of an intermediate stage in the steering drive. Here also, the transmission of the sensor drive should be selected such that the sensor is moved in its measurement range if the steering plate moves in its working range. The transmission of the sensor drive is naturally smaller than in the case of the embodiment described above. On the other hand, the disadvantage is that the rotation angle sensor is arranged on the drive side of the motor. The drive of a sensor via a spur wheel stage directly on the steering plate leads to a structure that takes up a lot of space, since the steering plate naturally has a large diameter.

Finally, it is also known to record the actual angle on the steering plate and/or on the steering motor via an impulse transmitter. However, only a relative measuring is thereby obtained, whereby a referencing run is required each time the steering drive is started.

The object of the invention is to create a steering drive for a wheel of a ground conveyor with an apparatus for recording the actual angle of the steered wheel, which gets by with a very simple sensor drive.

BRIEF SUMMARY OF THE INVENTION

In the case of the steering drive according to the invention, the shaft of the steering motor is designed as a hollow shaft. A sensor drive shaft, which is connected with the output side of the steering drive on the drive side, is inserted through the hollow shaft and works together with the rotation angle sensor on the side of the steering motor facing away from the steering drive.

In the case of the invention, the drive shaft of the sensor can work directly with a rotation angle sensor, for example a potentiometer, whereby any drive can be omitted. Instead, a very simple sensor drive can also be used, for example a spur wheel drive with two gear wheels, one of which is arranged on the drive shaft and the other on the sensor shaft.

The design of a steering drive according to the invention is particularly advantageous when the shaft of the steering motor is already designed as a hollow shaft, because the coaxial motor is inserted into the hollow shaft for the drive of the steered wheel.

One embodiment of the invention provides that the steering control is arranged on a printed circuit board, which is arranged on the sensor side of the steering motor and carries the rotation angle sensor. As already mentioned, this can be a potentiometer or a Hall sensor. The printed circuit board is preferably attached to the identification plate of the steering motor housing.

If a drive shaft of the traction drive motor is inserted through the hollow shaft of the steering motor, the drive shaft for the sensor is preferably designed as a drive sleeve. In accordance with another embodiment of the invention, the steering drive is a one- or two-stage planetary linkage with a planet carrier connected with the pivot plate. The drive shaft for the sensor is connected with the planet carrier. This connection can occur in that the drive shaft engages in an axial bore hole of the planet carrier and shaft and bore hole are designed such that a transmission of a rotary motion is effected.

BRIEF DESCRIPTION OF THE SEVERAL VIEWS OF THE DRAWINGS

Exemplary embodiments of the invention are explained below in greater detail using drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIGS. 1 and 2 both show a steering motor 10 with a hollow shaft 12, which is coupled with the input side of a steering drive 14. A drive shaft 16 of the steering drive 14 is connected with a steering plate of a steering drive (not shown) for a ground conveyor. A steering transmitter (not shown), e.g. a drawbar or a steering wheel, creates a target signal, which is converted into an input signal for the steering motor 10 in a steering controller or regulator (not shown). The speed of the steering motor is greatly reduced by the steering drive 14. The travel of the steered wheel (not shown) is e g. ±90°.

Figure 1:
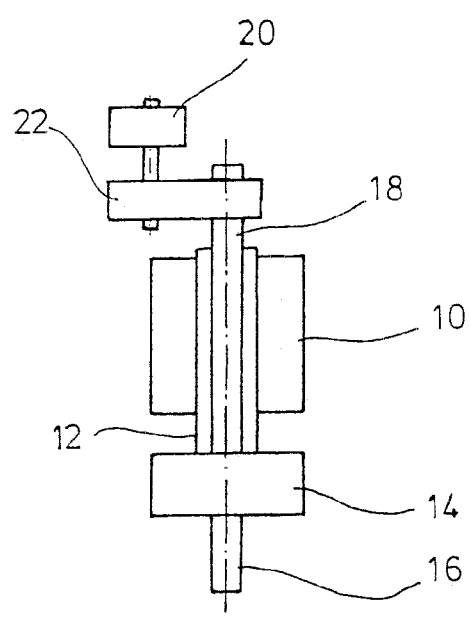
FIG. 1 shows schematically a first embodiment of a steering drive according to the invention.
Figure 2:
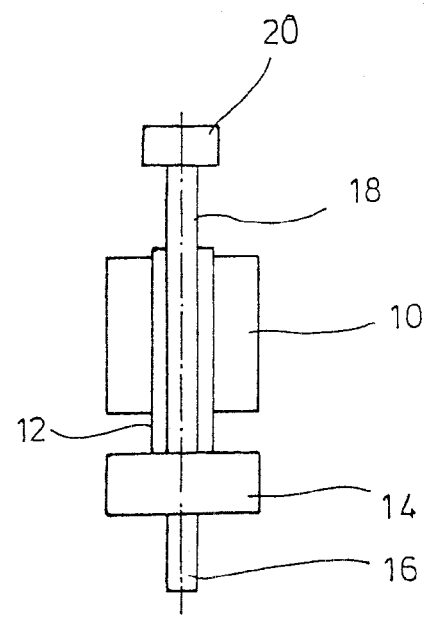
FIG. 2 shows schematically a second embodiment of a steering drive according to the invention.

A drive shaft 18 connected with the drive side of the steering drive 14 is inserted through the motor shaft 12 in FIGS. 1 and 2. In the case of the embodiment according to FIG. 2, the drive shaft is directly connected with a vehicle-mounted sensor 20. In FIG. 1, the sensor 20 is coupled with the shaft 18 via a sensor drive 22. The sensor has e.g. a measurement range of ±180°. The described coupling of the rotation angle sensor 20 with the steering plate leads to the recording of the absolute steering angle.

Figure 3:
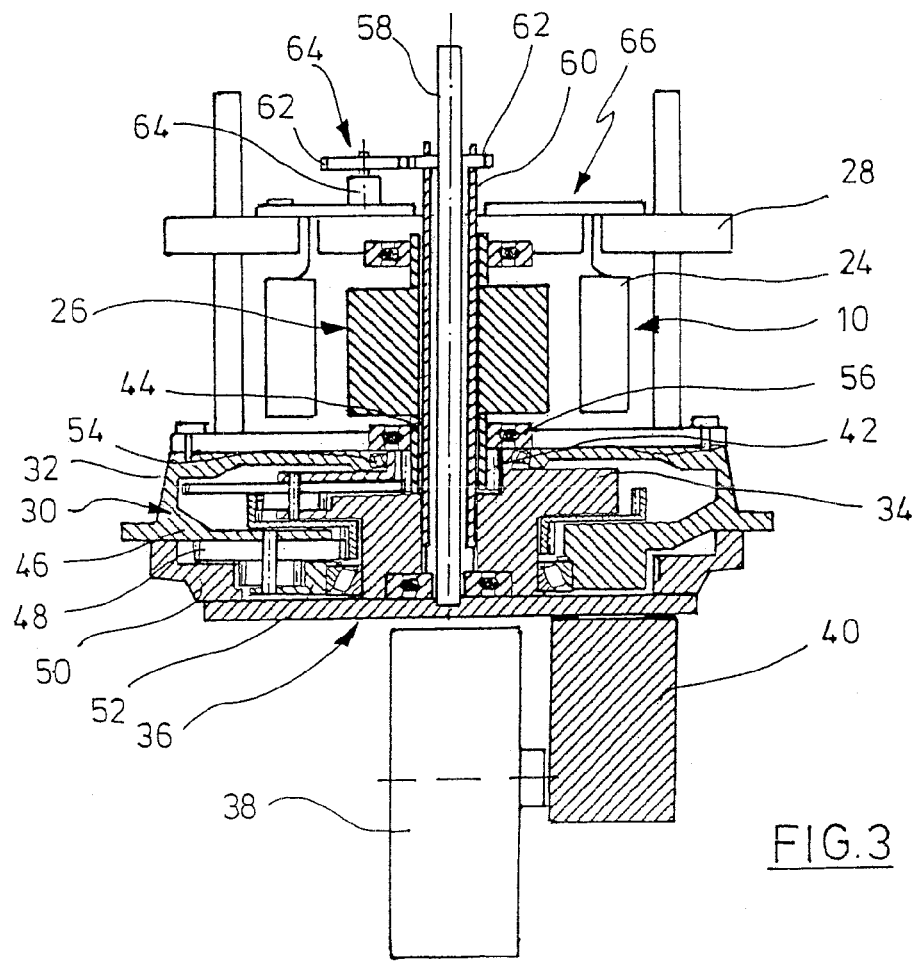
FIG. 3 shows schematically an exemplary constructive embodiment of a steering drive according to the invention.
Figure 4:
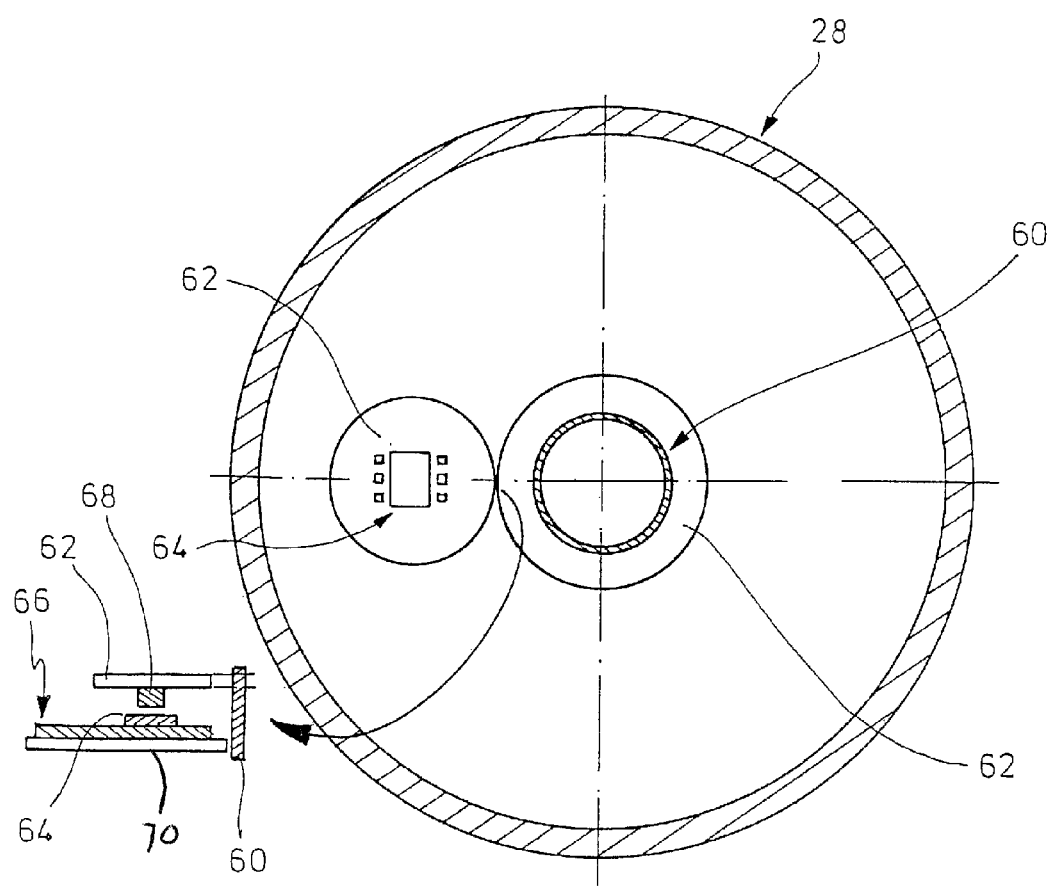
FIG. 4 shows a top view of a printed circuit board as shown in FIG. 3.

FIGS. 3 and 4 show one possible constructive version of the embodiment according to FIG. 1. The steering motor 10 with a stator 24 and a rotor 26 is arranged within a motor housing 28. The motor housing 28 is permanently connected with a drive housing 30, which is in turn permanently connected with the frame (not shown) of the ground conveyor (not shown). The drive housing 30 contains a two-stage planetary linkage with first stage planet 32, which are mounted in a planet carrier 34. The planet carrier 34 is permanently connected with a steering plate 36, on which a steered wheel 38 is mounted. It is also driven by a drive motor (not shown) via an angular drive 40. The larger stage of the stage planet 32 meshes with a pinion 42, which is in rotary union with a shaft 44 of the rotor 26. The smaller stage of the stage planet 32 meshes with a coupling shaft 46, which also works together with the larger stage of second stage planet 48. The smaller stage of the second stage planet 48 meshes with a sun gear 50, which is permanently connected with the steering plate 36.

The steering plate 36 is mounted between the planet carrier 34 and the drive housing 30 via a first tapered roller bearing 52 across from a ring-disk-shaped section 52 of the drive housing 30 and via another second tapered roller bearing 54 displaced in the axial direction. The rotor shaft 44 is mounted across from motor housing 28 with the help of a bearing 56.

The rotor shaft 44 is a hollow shaft, and a traction drive shaft 58 extends through the rotor shaft 44 and is connected (not shown) with the drive gear 40. Moreover, a drive sleeve 60 extends through the hollow rotor shaft 44. The drive sleeve 60 is connected in a torque-proof manner with the planet carrier 34 and thus with the steering plate 36 in that it engages into a bore hole of the planet carrier 34. There is e.g. a wedge gearing for rotary transmission between the drive sleeve 60 and the planet carrier 34.

The drive sleeve 60 extends beyond the upper identification plate of the motor housing 28 and is connected in a torque-proof manner with a first spur wheel 62, which meshes with a second spur wheel 62. The second spur wheel 62 sits on a pivot pin 64 e.g. a potentiometer.

As can be seen, a rotation of the steering plate 36 is transferred directly via the drive sleeve 60 and the sensor drive 62, 64 to a sensor 64. It sits on a printed circuit board 66, which contains the steering controller for the steering motor 10.

The version of the rotation angle sensor is enlarged in FIG. 4. It can be seen that a magnet arrangement 68 is arranged on the bottom side of the gear wheel 62, which works together with a Hall sensor 64 on the printed circuit board 66, which in turns is applied to the identification plate 70 of motor housing 28.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Steering drive for a wheel of a ground conveyor with an apparatus for recording the actual angle of the steered wheel, with a steering motor, a steering controller or regulator driven by a steering angle transmitter, the input signal of which is given to the steering motor, a steering drive coupled with the shaft of the steering motor, the output side of which is connected with a steering plate, which mounts the single steered wheel, and a rotation angle sensor, which records the rotation angle of the steering plate, characterized in that the shaft (12, 44) of the steering motor (10) is designed as a hollow shaft, through which a sensor drive shaft (18, 60) is inserted and which is connected on the drive side with the output side of the steering drive (14) and works together with the angle sensor (20, 64) on the side of the steering motor (10) facing away from the steering drive (14).

2. Steering drive according to claim 1, characterized in that the drive shaft (18) affects the sensor (20) via a sensor drive (22).

3. Steering drive according to claim 2, characterized in that the sensor drive (22) is a spur wheel drive.

4. Steering drive according to claim 1, characterized in that the steering controller is arranged on a printed circuit board (66), which is arranged on the sensor side of the steering motor (10) and also carries the speed sensor (64).

5. Steering drive according to claim 1, characterized in that the rotation angle sensor (64) is a Hall sensor or a potentiometer.

6. Steering drive according to claim 4, characterized in that the printed circuit board (66) is applied to the identification plate of the steering motor housing (28).

7. Steering drive according to claim 1, characterized in that the drive shaft (60) is designed as a drive sleeve.

8. Steering drive according to claim 1, characterized in that the steering drive is a one- or two-stage planetary linkage with a planet carrier (34) connected with the steering plate (36) and the drive shaft (60) is connected with the planet carrier (34).

9. Steering drive according to claim 8, characterized in that the drive shaft (60) engages in a form-locking manner in an axial bore hole of the planet carrier (34) and the bore hole and drive shaft have rotating pickup means.

* * * * *